United States Patent [19]

Paxman

[11] Patent Number: 5,384,455
[45] Date of Patent: Jan. 24, 1995

[54] MEASUREMENT-DIVERSE SPECKLE IMAGING

[75] Inventor: Richard G. Paxman, Ann Arbor, Mich.

[73] Assignee: Environmental Research Institute of Michigan, Ann Arbor, Mich.

[21] Appl. No.: 46,094

[22] Filed: Apr. 12, 1993

[51] Int. Cl.$^6$ .............................................. G01J 1/20
[52] U.S. Cl. .................................. 250/201.9; 356/121
[58] Field of Search ........................... 250/201.9, 201.1; 356/121, 124, 353, 354

[56] References Cited

U.S. PATENT DOCUMENTS

| | | | |
|---|---|---|---|
| 4,309,602 | 1/1982 | Gonsalves et al. | 250/201.9 |
| 4,490,039 | 12/1984 | Bruckler et al. | 356/121 |
| 4,670,646 | 6/1987 | Spivey | 250/201.9 |
| 5,046,824 | 9/1991 | Pepper | 359/72 |
| 5,093,563 | 3/1992 | Small et al. | 250/201.9 |
| 5,120,128 | 6/1992 | Ulich et al. | 250/201.9 |
| 5,198,653 | 3/1993 | Shen et al. | 250/201.9 |
| 5,278,402 | 1/1994 | Wein | 250/201.9 |
| 5,300,766 | 4/1994 | Granger et al. | 250/201.9 |

OTHER PUBLICATIONS

Paxman, et al; Joint Estimation of Object and Aberrations by Using Phase Diversity; Jul. 1992.
Paxman, et al; Phase-Diverse Speckle Interferometry; Apr. 1992.
Paxman, et al; Fine-Resolution Astronomical Imaging Using Phase-Diverse Speckle; Nov. 1992.
Paxman, et al; Fine-Resolution Imaging of Solar Features Using Phase-Diverse Speckle Imaging; Sep. 1992.

*Primary Examiner*—David C. Nelms
*Assistant Examiner*—John R. Lee
*Attorney, Agent, or Firm*—Brooks & Kushman

[57] ABSTRACT

A method and apparatus for obtaining fine resolution imaging of extended objects in the presence of unknown time-varying aberrations, wherein the method is accomplished by obtaining data corresponding to multiple, measurement-diverse images of the extended object collected for each of a plurality of aberration realizations. The object and unknown aberrations are then jointly estimated, preferably using constrained likelihood-based estimation techniques. The apparatus utilizes a conventional optical system, at least two detector arrays for detecting a plurality of phase-diverse images, a shutter system so that a specklegram can be captured at each of the phase-diverse arrays for each of a plurality of aberration realizations, and a computer including a processor, sufficient memory restoring the digital data corresponding to the captured images, and logic for estimating the object and unknown aberrations.

25 Claims, 2 Drawing Sheets

MEASUREMENT-DIVERSE SPECKLE IMAGING

TECHNICAL FIELD

The present invention relates to fine-resolution imaging of extended objects in the presence of time-varying aberrations.

BACKGROUND ART

Various methods and apparatus have been developed to perform fine-resolution imaging in the presence of time-varying aberrations encountered, for example, when imaging through a turbulent medium (such as the atmosphere) or when the optical system is mechanically unstable. Known approaches include stellar speckle imaging (shown in FIG. 2), which requires the collection of many short-exposure images (specklegrams) of the same object. Each short-exposure image is formed through a different atmospheric realization. The exposure time for each of these multiple atmospheric realizations must be short enough (about 10 milliseconds) that the evolving atmosphere can be regarded as frozen during exposure. Current stellar speckle imaging approaches perform an averaging of the data as part of the process of individually estimating the Fourier modulus or the Fourier phase of the object. The final estimated object is then constructed by combining the Fourier modulus and phase estimates and performing an inverse Fourier transform. Speckle imaging also requires a cumbersome atmospheric-calibration step utilizing images of an unresolved object seen through atmospheric turbulence having the same statistics.

Reconstruction of the object from a sequence of specklegrams could be substantially improved if estimates for the individual point spread functions (PSFs) for each specklegram were available. This is the rationale behind deconvolution with wavefront sensing (also referred to as self-referenced speckle holography), which employs a Hartmann-Shack wavefront-sensor to estimate the PSFs for each atmospheric realization. However, this wavefront-sensor is a relatively complex optical system that must be carefully aligned. Moreover, the performance of the wavefront-sensor can degrade with object extent.

In compensated imaging, an attempt is made to sense the aberrated wavefront and correct it with a deformable mirror prior to detection. When it can be successfully accomplished, pre-detection correction is preferable to post-detection correction since it typically operates with a better signal-to-noise ratio. There are a variety of reasons, however, that compensated imaging may not be a completely satisfactory solution for imaging through turbulence in every case. Compensated imaging systems are typically very expensive, complicated, and sensitive to systematic errors. Maintenance and calibration are ongoing tasks and the risk of system failure cannot be overlooked. Also, the compensation will never be perfect and there may be a need for post-detection correction of residual errors.

Some researchers have proposed adaptive correction of anisoplanatic (space-variant) effects through the use of multiple guide stars, multiple wavefront sensors, and/or multiple deformable mirrors in a single system. Whereas these proposed schemes are intriguing, adaptive systems utilizing combinations of these techniques would likely be extremely complex.

U.S. Pat. No. 4,309,602, issued to Gonsalves et al., for "Wavefront-Sensing by Phase Retrieval" discloses a method of phase diversity which may be regarded as an indirect wavefront-sensor since phase aberrations are estimated from image data. Phase diversity requires the collection of two or more phase-diverse images, one of which is the conventional focalplane image that has been degraded by the unknown aberrations. Additional images of the same object are formed by perturbing these unknown aberrations in some known fashion. This can be accomplished with very simple optical hardware by, for example, utilizing a simple beam splitter and a second detector array translated along the optical axis, which further degrades the imagery with a known amount of defocus. The goal is to identify a combination of object and aberrations that is consistent with all of the collected images, given the known phase diversities. Phase diversity (shown in FIG. 3) was disclosed as a component in a compensated imaging system. However, phase diversity could also be used to create a post-detection estimate of the object. In the case of faint objects, however, the signal may not be strong enough to get a high fidelity object estimate with only a single aberration realization.

One object of the present invention is, therefore, to provide a method and apparatus for recovering a fine-resolution image of an object and identifying aberrations including a data collection and processing approach for imaging in the presence of phase aberrations, such as atmospheric turbulence, in which only simple optical hardware is required.

Another object of the present invention is to provide a method and apparatus for acquiring and estimating images which is robust to systematic error.

Another object of the present invention is to provide an apparatus for acquiring and estimating images which requires little or no calibration.

Another object of the present invention is to provide a method and apparatus for estimating images in which there is no averaging of the data nor use of intermediate estimates in which information is lost.

Another object of the present invention is to provide a method and apparatus for improving the quality of object estimates over estimates that can be achieved from a single aberration realization.

DISCLOSURE OF INVENTION

According to the present invention, a method and apparatus are provided for obtaining fine-resolution imaging of extended objects in the presence of unknown time-varying aberrations. The method is accomplished by obtaining data corresponding to multiple, measurement-diverse images of the extended object collected for each of a plurality of aberration realizations. The object and unknown aberrations are then jointly estimated, preferably using constrained likelihood-based estimation techniques. The estimated imagery may then be recreated using conventional means such as an electronic display monitor or a printing device.

In one embodiment, the apparatus of the present invention utilizes a conventional optical system, at least two conventional detector arrays for detecting image data corresponding to at least two phase-diverse images, a shutter system so that a specklegram (a short time exposure) can be captured at each of the phase-diverse arrays for each of a plurality of aberration realizations, and a computer including a processor, sufficient storage memory for storing the digital data corresponding to the captured images, and logic for estimating the object and unknown aberrations. A joint estimate of the object and the multiple aberration realizations is preferably developed using constrained likelihood-based estimators. In one embodiment, logic for performing constrained maximum-likelihood estimation is utilized, including an appropriate noise model.

The objects, features and advantages of the present invention are readily apparent from the following detailed description of the best modes for carrying out the invention when taken in conjunction with the accompanying drawings.

BEST MODE FOR CARRYING OUT THE INVENTION

Figure 1:
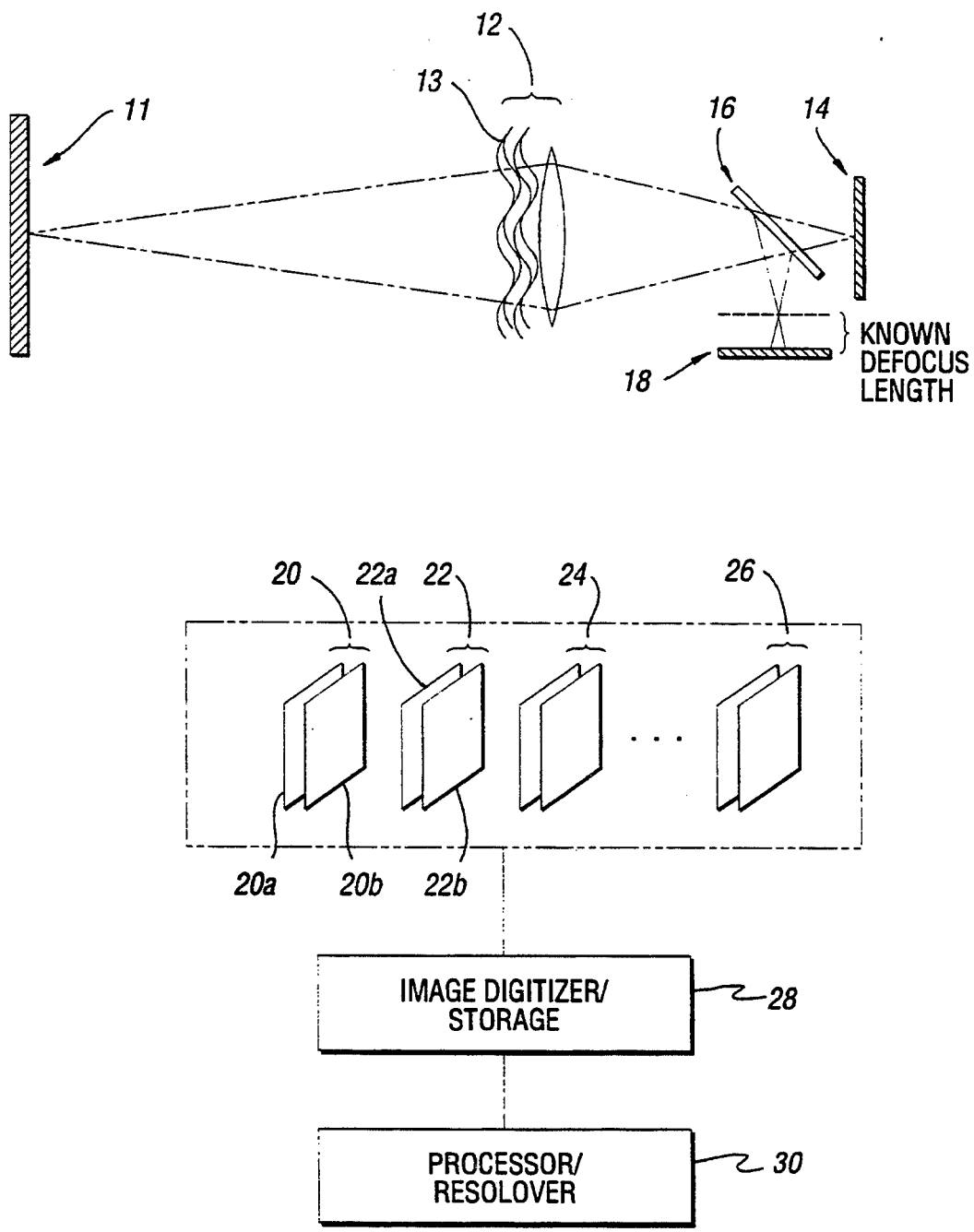
FIG. 1 is a combined block pictorial representation of a phase-diverse speckle imaging system of the present invention.
Figure 2:
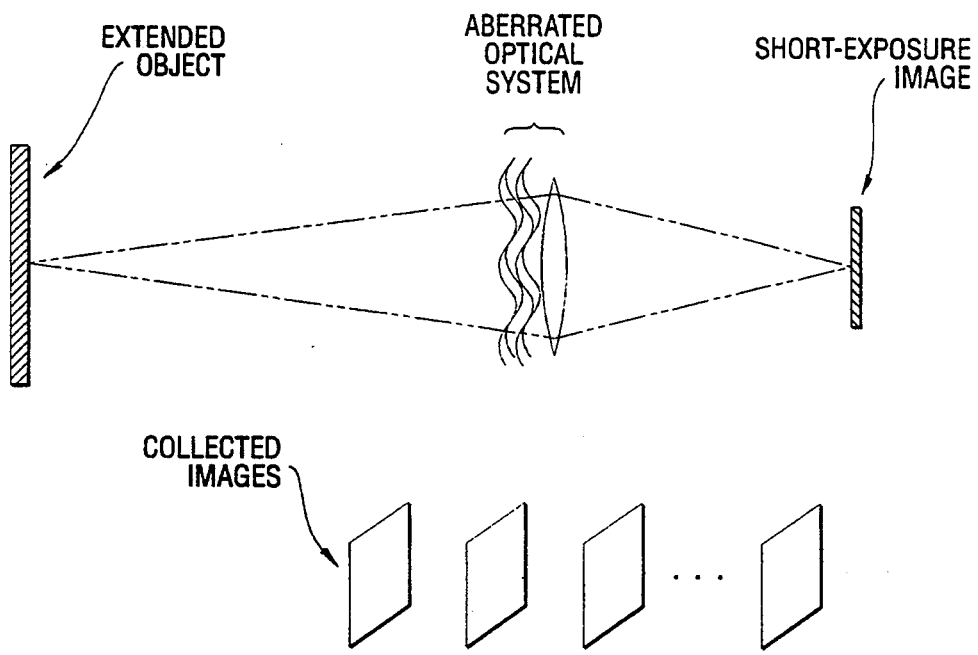
FIG. 2 is a combined block-pictorial representation of a stellar speckle imaging system.
Figure 3:
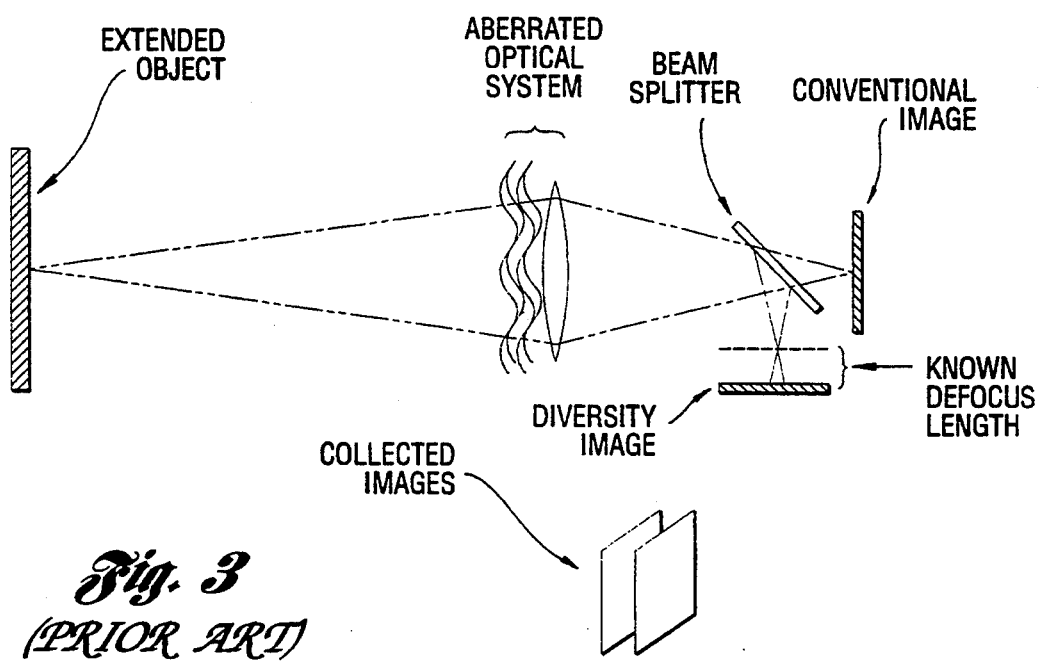
FIG. 3 is a combined block-pictorial representation of a phase-diversity imaging system.

Referring to FIG. 1, one embodiment of the system of the present invention, generally referred to as 10, includes a conventional optical system 12, a first detector array 14 for collection of a first image at the focal plane, a beam splitter 16 which directs a portion of the beam to a second detector array 18 for collecting a second, phase-diverse image having a known amount of defocus. Multiple short exposures 20–26 for each of the phase-diverse images (i.e., a first short exposure of the focused image 20a and the defocused image 20b at 20, a second exposure of the focused image 22a and the defocused image 22b at 22, corresponding to a second aberration realization, etc.) are collected and digitized at 28. These digital image data are then accessed at 30 to estimate the common object 11 and unknown aberrations 13 in each aberration realization.

The digitizer 28 may be an integral component of the detector arrays 14, 18, such as for example when the arrays each comprise a conventional CCD camera. Alternatively, the digitizer could be any one of a number of commercially available devices which may be utilized to digitize images captured on film or some other analog medium.

The processor/estimator 30 may be a conventional computer including storage memory adequate for storing the collected digital images, a processor, and suitable logic for performing the estimating functions disclosed herein.

Once the images are collected, at 20–26, the data are converted to digital form and are reduced to form a joint estimate of the common object and the multiple aberration realizations. Constrained, likelihood-based estimators are preferably utilized for this purpose. In one embodiment, a constrained maximum-likelihood estimation under a photon-limited (Poisson) noise model, where a non-negativity object constraint is enforced, is utilized to develop the object and aberration estimates. Again, however, it will be appreciated by those skilled in the art that other constrained likelihood-based estimators, utilizing various noise models appropriate to the specific environmental and equipment characteristics of a particular installation, can also usefully be employed for this purpose.

FIG. 1 illustrates one embodiment of a phase-diverse speckle-imaging system. However, other measurement-diverse speckle-imaging systems may be developed consistent with the teaching of the present invention. For example, the imaging system may be perturbed in other ways to create diversity, such as data collection for (a) an image for which a prescribed phase plate is introduced conjugate to the pupil, (b) an image for which a prescribed apodization plate is introduced conjugate to the pupil, (c) an image with a different wavelength band, or (d) an image for a similar object in a different location in the field of view. These images, each arising from different system perturbations, may be generally referred to as measurement-diverse images. As explained herein, collection of measurement-diverse images, each collected for multiple short exposures for each of several aberration realizations, results in an improved, finer resolution reconstruction of an extended object than with previously utilized speckle-imaging or phase-diversity imaging techniques.

Joint Estimation of Object and Aberrations

According to one embodiment of the present invention, an estimation-theoretic approach is utilized to accomplish the joint estimation of the object (common to all collected frames/images) and the phase aberrations for each atmospheric realization. An incoherent imaging model is constructed that captures the dependence of the noiseless imagery upon the object and the optical system, including atmospheric aberrations. A noise model is then introduced to account for detector or photon noise that will be present in the detected imagery. It is then possible to write down a probability law for the collected imagery, given the object and the system aberrations.

The incoherent image-formation process is approximated by the following discrete convolution:

$$g_{jk}(x) = \sum_{x'} f(x') s_{jk}(x - x'), \quad \begin{array}{l} j = 1,2,\ldots J \\ k = 1,2,\ldots K \end{array} \quad (1)$$

where f is the object array, $S_{jk}$ is a space-invariant point spread function (PSF) for the $j^{th}$ atmospheric realization and having diversity k, $g_{jk}$ is the corresponding noiseless image, and x is a two-dimensional coordinate. The object, PSFs, and images are treated as periodic arrays with a period cell of size N×N. Since any detected imagery will contain noise, a noise model must be adopted.

In general, the detected image $d_{jk}$ is a function of the noiseless image $g_{jk}$, and $$d_{jk} = N\{g_{jk}\},$$

where N {·} is a noise operator that captures the characteristics of the particular noise model adopted.

There will be a total of JK detected images collected where J is the total number of aberration realizations and K is the number of diversity channels. In the embodiment shown in FIG. 1, K=2.

Diversity is introduced by including a known phase function in the generalized pupil function of the system:

$$H_{jk}(u) = |H_{jk}(u)| \exp\{i[\Phi_j(u) + \theta_{jk}(u)]\}, \quad (2)$$

where $\Phi_j$ is the unknown phase-aberration function to be estimated, $\theta_{jk}$ is a known phase function associated with the $k^{th}$ diversity image, and u is the discrete spatial-frequency variable. The phase-aberration function can be parameterized by coefficients for an appropriate set of basis functions:

$$\phi_j(u) = \sum_{m=1}^{M} a_{jm}\psi_m(u), \quad (3)$$

It is convenient to lexigraphically arrange the parameters $a_{jm}$ in a parameter vector $\alpha$.

The incoherent point spread function $s_{jk}$ is just the modulus squared of the Fourier transform of the generalized pupil function $H_{jk}$.

The method of maximum-likelihood estimation may be utilized to construct an estimator for the object and aberrations. This is accomplished by deriving the log-likelihood function from the probability law.

In one embodiment of the present invention, it is assumed that the data are photon noise limited so that the number of photo-conversions that occur at each detector element will be Poisson-distributed random variable with a mean value prescribed by the noiseless image, g, given in units of mean detected photons per pixel. Assuming that the number of photo-events realized will be statistically independent for each pixel, the probability of realizing an entire data set, $\{d_{jk}\}$, will be:

$$Pr\{d_{jk}\} = \prod_{j=1}^{J}\prod_{k=1}^{K}\prod_{x} \frac{g_{jk}(x)^{d_{jk}(x)}\exp(-g_{jk}(x))}{d_{jk}(x)!}. \quad (4)$$

Again, as will be appreciated by those skilled in the art, other noise models may be utilized, such as an additive Gaussian model where, for example, the data is relatively less limited by the light level (i.e., photon noise), and more by noise associated with other factors such as camera electronics better characterized as Gaussian.

A modified log-likelihood function for the joint estimation of the object and aberrations is:

$$L(f,\alpha) = \sum_{j=1}^{J}\sum_{k=1}^{K}\sum_{x}[d_{jk}(x)\ln g_{jk}(x) - g_{jk}(x)], \quad (5)$$

where an inconsequential constant has been dropped.

Unfortunately, there is no known algorithm that maximizes the log-likelihood function directly. Therefore, non-linear optimization techniques must be utilized to find the maximum-likelihood estimate. In one embodiment, a conjugate-gradient algorithm, which requires the gradient of the log-likelihood function to be computed at each iteration, is utilized. Although this computation would be intractable if the method of finite differences were employed, a closed form expression for the gradient has been derived, and is given by:

$$\frac{\delta}{\delta f(x_i)}L = \sum_{j=1}^{J}\sum_{k=1}^{K}\sum_{x}\frac{d_{jk}(x)s_{jk}(x-x_i)}{\sum_{x'}f(x')s_{jk}(x-x')} - \quad (6)$$

$$\frac{1}{N^2}\sum_{j=1}^{J}\sum_{k=1}^{K}\sum_{u}|H_{jk}(u)|^2$$

$$\frac{\delta}{\delta a_{jm}}L = -2\sum_{u}\psi_m(u)Im\left\{\sum_{k=1}^{K}H_{jk}(u)\frac{1}{N^2}\right. \quad (7)$$

$$\left. \sum_{x'}h^*_{jk}(x')\exp\{i2\pi\langle u,x'\rangle/N\}\cdot\sum_{x}\frac{d_{jk}(x)f(x-x')}{\sum_{x''}f(x'')s_{jk}(x-x'')}\right\}$$

where the operator Im $\{\cdot\}$ takes the imaginary part of the argument, the asterisk implies complex conjugate, and $\{\cdot,\cdot\}$ denotes an inner product.

To speed the optimization, an initial object estimate, derived from Knox-Thompson or triple correlation methods, may be utilized. It will also be appreciated by those skilled in the art that other classes of optimization algorithms, such as simulated annealing, genetic algorithms, or expectation-maximization algorithms may be constructed as an alternative to the gradient-search methods described above.

It will be appreciated by those skilled in the art that any of a number of conventional means may be utilized to produce an image of the estimated object, including electronic display monitors or printing devices.

Thus, the apparatus and method of the present invention provides for fine-resolution imaging utilizing both speckle imaging and phase-diversity concepts. The combination of these concepts, along with the joint estimation of the object and the phase aberrations utilizing constrained likelihood-based estimators and an incoherent imaging model, yield an improved, fine-resolution estimation of the object and the aberrations. It will also be appreciated by those skilled in the art that the method of the present invention, particularly the joint object and aberration estimation techniques, may be utilized to perform post-detection correction of images obtained using existing systems, such as the compensated imaging systems discussed hereinabove.

Again, diversity can be achieved by other known methods of perturbing the system, without departing from the spirit of the present invention. In addition, other estimating methods, including estimators that use prior information about the object, the time-varying aberrations, the imaging system, the detector system, and the noise that will be encountered, may be utilized, without departing from the spirit of the present invention.

It is also consistent with the spirit of the present invention to estimate aberrations other than those specifically mentioned herein, including warped mirror figures, misalignments among optical elements, and anisoplanatic (space-variant) aberrations due to, for example, a volume-turbulence model.

Thus, while the best mode and alternate modes for carrying out the invention have been described in detail, those familiar with the art to which this invention relates will recognize various alternative designs and embodiments for practicing the invention as disclosed by the following claims.

What is claimed is:

1. An imaging apparatus comprising:
   a plurality of measurement-diverse detectors, each detector including means for acquiring a plurality of specklegram images of an object;
   storage memory for storing the acquired images in digital form;
   a processor; and
   logic for accessing the stored images and estimating the object.

2. The apparatus of claim 1 wherein the plurality of measurement-diverse detectors includes:

a first detector; and a second detector including means for perturbing the image in a predefined manner.

3. The apparatus of claim 1 wherein the images collected by each of the detectors are phase-diverse.

4. The apparatus of claim 2 wherein the first detector is positioned to collect the image at the focal plane, and the second detector is positioned for collecting a second image having a known amount of defocus.

5. The apparatus of claim 1 wherein the logic for estimating the object includes logic for jointly estimating the object and any aberrations utilizing a constrained, likelihood-based estimator.

6. The apparatus of claim 1 wherein the logic for estimating the object includes logic for jointly estimating the object and any associated aberrations utilizing a constrained, maximum likelihood estimator.

7. The apparatus of claim 1 wherein the logic for estimating the object includes logic for jointly estimating the object and any associated aberrations utilizing a constrained, likelihood-based estimator and a noise model.

8. The apparatus of claim 7 wherein the noise model utilizes a Poisson distribution.

9. The apparatus of claim 7 wherein the noise model utilizes a Gaussian distribution.

10. An apparatus for imaging extended objects in the presence of unknown, time-varying aberrations, the apparatus comprising:

a first detector array for acquiring a plurality of first specklegram images of an object;

a second detector array for acquiring a plurality of second specklegram images of an object, the second detector array including means for perturbing the image in a pre-defined manner;

storage memory for storing the acquired specklegrams in digital form;

a processor; and logic for accessing the stored specklegrams and estimating the object.

11. The apparatus of claim 10 wherein the first detector array is positioned to collect the specklegrams at the focal plane, and the second detector array is positioned for collecting specklegrams having a known amount of de-focus.

12. The apparatus of claim 10 wherein the logic for estimating the object includes logic for jointly estimating the object and the aberrations utilizing a constrained, likelihood-based estimator.

13. The apparatus of claim 10 wherein the logic for estimating the object includes logic for jointly estimating the object and the aberrations utilizing a constrained, maximum-likelihood estimator.

14. The apparatus of claim 10 wherein the logic for estimating the object includes logic for jointly estimating the object and the aberrations utilizing a constrained, likelihood-based estimator and a noise model.

15. The apparatus of claim 10 wherein the noise model utilizes a Poisson distribution.

16. The apparatus of claim 10 wherein the noise model utilizes a Gaussian distribution.

17. A method of imaging extended objects in the presence of unknown, time-varying aberrations, the method comprising:

acquiring a plurality of specklegrams images from at least two measurement-diverse detectors;

storing the acquired images in digital form; and accessing the stored images and estimating the object.

18. The method of claim 17 wherein measurement diversity is achieved by perturbing the image acquired at least one of the detectors in a predefined manner.

19. The method of claim 17 wherein the images collected by each of the detectors are phase-diverse.

20. The method of claim 17 wherein a first detector is positioned to collect the image at the focal plane, and a second detector is positioned for collecting a second image having a known amount of defocus.

21. The method of claim 17 wherein the step of estimating the object includes jointly estimating the object and any aberrations utilizing a constrained, likelihood-based estimator.

22. The method of claim 17 wherein the step of estimating the object includes jointly estimating the object and any aberrations utilizing a constrained, maximum likelihood estimator.

23. The method of claim 17 wherein the step of estimating the object includes jointly estimating the object and any aberrations utilizing a constrained, likelihood estimator and a noise model.

24. The method of claim 17 wherein a Poisson distribution is utilized as the noise model.

25. The method of claim 17 wherein a Gaussian distribution is utilized as the noise model.

* * * * *